Feb. 17, 1931. R. C. NEWHOUSE 1,792,921
POWER TRANSMITTING MECHANISM
Filed March 31, 1928 2 Sheets-Sheet 1

Inventor
R. C. Newhouse
by
Attorney

Patented Feb. 17, 1931

1,792,921

UNITED STATES PATENT OFFICE

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

POWER-TRANSMITTING MECHANISM

Application filed March 31, 1928. Serial No. 266,222.

The present invention relates in general to improvements in the construction and operation of power transmitting mechanisms employing endless belts cooperating with rotary driving and driven members.

An object of the invention is to provide a new and useful power transmission mechanism of the type wherein an endless belt drivingly cooperates with the side surfaces of V-grooves formed in the periphery of a rotary driving member or a driven member, or both.

Another object of the invention is to provide certain improvements in power transmission mechanisms especially applicable to multiple belt drives employing relatively elastic elements, such as disclosed and claimed in United States Patent 1,662,511, granted March 13, 1928.

In the drive forming the subject of United States Patent 1,662,511, a plurality of independent elastic V-belts having uniform transverse cross sectional area throughout, are caused to cooperate with the alined V-grooves of rotary sheaves, the said grooves likewise having uniform cross sectional area throughout. With such a drive, it will be apparent that as the belts enter the grooves, and travel from the tangent into the annular grooves, the inner portions of the belts naturally expand transversely and the outer portions thereof contract slightly. The extent of this expansion and contraction is dependent upon the pitch diameter of the groove. The expansion at the lower portion of each belt while rounding a curve increases the tractive effort, but also tends to force the belt out of the groove. The belt furthermore produces a complete peripheral closure for the lower portion of the groove, thereby preventing escape of air from within the groove and likewise retarding free entry of the belt into the groove. While these features of the prior device are not to be considered seriously detrimental to its operation, they nevertheless result in some loss of energy.

It is a more specific object of the invention to avoid excessive internal friction caused by the forcing of the belt out of the groove because of the transverse expansion following bending, and yet maintain sufficient driving friction between the belt and the groove walls. It is a further specific object of the invention to provide a structure wherein a fluid confined within the grooves may freely escape as the belt enters the groove and travels therealong, thereby enhancing the efficiency of the structure.

A clear conception of a number of embodiments of the present improvement, may be had by referring to the drawings accompanying and forming a part of this specification in which like reference characters designate the same or similar parts in the various views.

Figure 1:
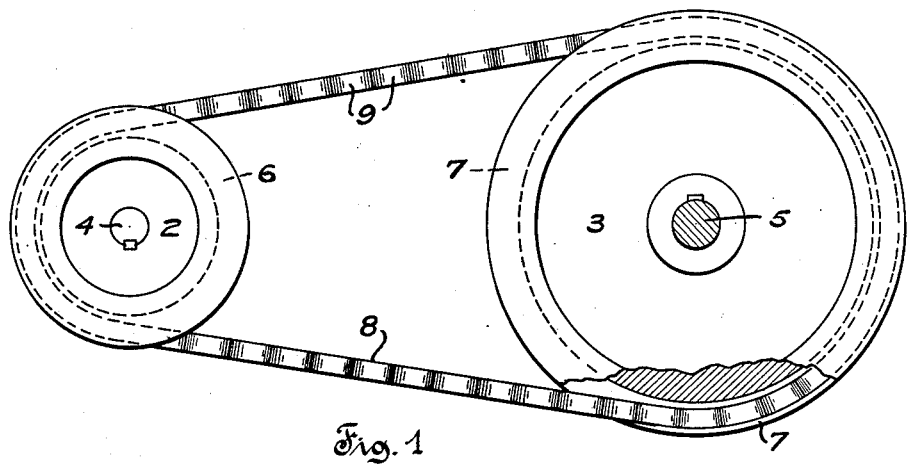
Fig. 1 is a part sectional side elevation of an endless V-belt drive comprising driving and driven sheaves and a plurality of independent endless elastic belts cooperating therewith.
Figure 2:
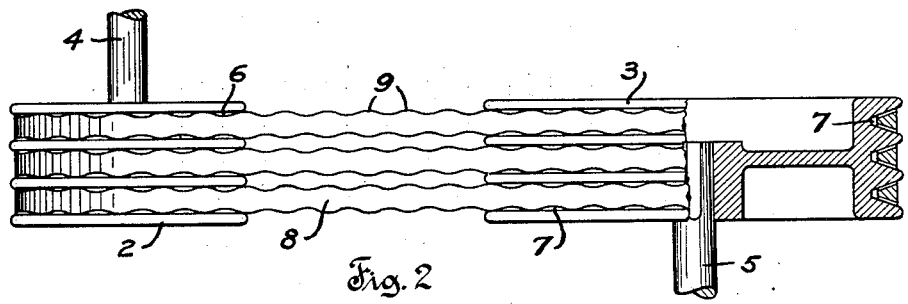
Fig. 2 is a part sectional top view of the drive illustrated in Fig. 1.
Figures 3, 4:
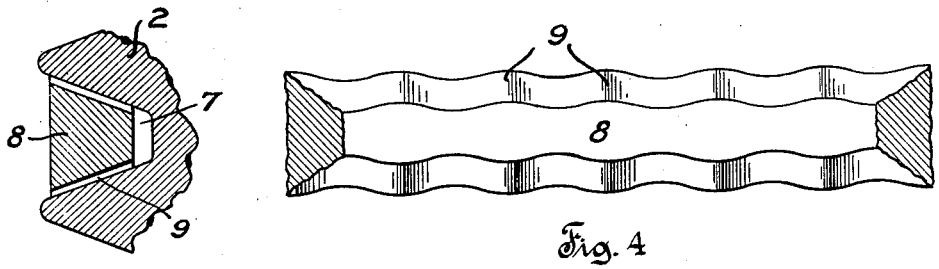
Fig. 3 is a fragmentary enlarged radial section through the driving sheave and a cooperating belt.
Fig. 4 is a fragmentary bottom view of one of the improved driving belts.

Referring specifically to the embodiment of the invention illustrated in Figs. 1 to 4 inclusive, the power transmitting device comprises a driving member or sheave 2 secured to a rotary shaft 4, a driven member or sheave 3 secured to a rotary shaft 5, and a plurality of independent endless belts 8 cooperating with peripheral V-grooves 6, 7 of the sheaves 2, 3 respectively. The sheaves 2, 3 and their supporting shafts 4, 5 are rotatable about substantially parallel axes and the grooves 6 of the sheave 2 are alined with the grooves 7 of the sheave 3 as shown in Fig. 2. The belts 8 are of V-shaped cross-section being preferably formed of rubber composition or other elastic material. Each of the belts 8 has opposite corrugated sides the ridges 9 of which extend transversely across the belt sides from the interior to the exterior thereof. The ridges 9 of the transverse corrugations are successively cooperable with the sides of the grooves 6, 7 to provide series of local contact surfaces separated by radial spaces as shown in the drawing.

Figure 6:
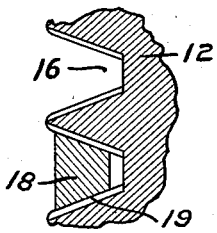
Fig. 6 is a fragmentary radial section through the sheave and belt of Fig. 5.
Figure 5:
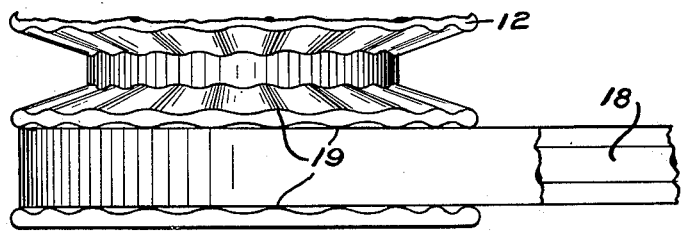
Fig. 5 is a fragmentary top view of a modified form of drive embodying a sheave having a corrugated groove cooperating with a belt of uniform transverse cross section.

Referring specifically to the embodiment of the invention illustrated in Figs. 5 and 6, the power transmitting device comprises a rotary member or sheave 12 having corrugated peripheral V-grooves 16 the ridges 19 of which cooperate with the opposite side driving surfaces of endless V-belts 18 having substantially uniform cross-sectional area throughout. The belts 18 are likewise preferably formed of rubber composition or other relatively elastic material. The corrugations of the grooves 16 may extend radially relative to the sheave axis, and the successive ridges 19 are engageable with the advancing side surfaces of the belts 18 to provide a series of local contact surfaces separated by radial spaces.

Figure 8:
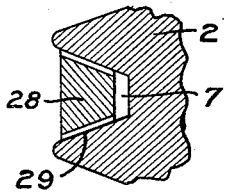
Fig. 8 is a fragmentary radial section through a sheave having a belt of the type shown in Fig. 7, cooperating therewith.
Figure 7:
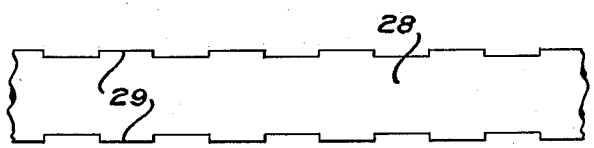
Fig. 7 is a top view of a fragment of a modified form of belt embodying the invention.
Figure 9:
Fig. 9 is a side view of a fragment of a belt such as shown in Figs. 7 and 8.

Referring specifically to the embodiment of the invention illustrated in Figs. 7, 8 and 9, the power transmitting device comprises a rotary member or sheave 2 having peripheral V-grooves of uniform cross-section throughout, which are formed to cooperate with local pads 29 projecting laterally from the opposite sides of endless belts 28. The belts 28 are preferably formed of rubber composition or other similarly elastic material. The pads 29 of the belts 28 extend transversely across the opposite belt sides from the interior to the exterior thereof. The pads 29 obviously provide a series of local contact surfaces cooperable with the side surfaces of the grooves 7, these surfaces being separated by radial spaces.

Figure 11:
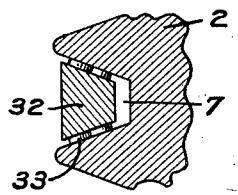
Fig. 11 is a fragmentary radial section through a sheave having a belt of the form shown in Fig. 10, cooperating therewith.
Figure 10:
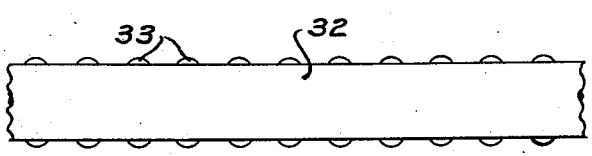
Fig. 10 is a top view of a fragment of still another form of belt embodying the invention.
Figure 12:
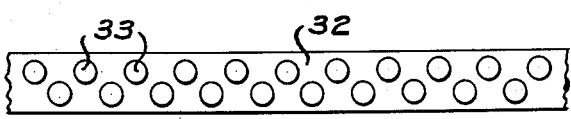
Fig. 12 is a side view of a fragment of a belt such as shown in Figs. 10 and 11.

Referring specifically to the embodiment of the invention illustrated in Figs. 10, 11 and 12, the power transmitting device comprises a rotary member or sheave 2 having peripheral V-grooves of uniform cross-section throughout, the grooves being formed for cooperation with local pads or buttons 33 projecting laterally from the opposite sides of endless belts 32. The belts 32 are preferably formed of rubber composition or other relatively elastic material. The buttons 33 of the belt 32 are disposed in series along the belt sides, and provide a plurality of local contact surfaces which are cooperable with the side surfaces of the grooves 7.

During normal operation of the several power transmitting mechanisms, the driving sheave is rotated by suitable application of power and transmits rotary motion to the driven sheave through the belts, in a well known manner. As the belts enter the grooves and bend in order to round the curves of the sheaves, the inner portions thereof tend to expand laterally while the outer portions contract laterally a slight amount. The local contact surfaces or pads provided by each of the several embodiments of the invention disclosed herein, permit the belts to enter the grooves with minimum friction since the spaces between the successive pads allow the expansion of the belts due to bending thereof, to take place along the driving surfaces of the grooves and the belts. The harder the pull on the belt, the greater the contact pressure and surface will be, without introducing objectionable tendency of forcing the belts out of the grooves. By virtue of the formation of the belts with portions within the grooves bridging the successive contact pads, the expansion of the belts at the pads will naturally cause lateral pressure thereby enhancing the traction. This would not be the case if the local contacts were separated by transverse spaces extending from one wall to the other of each groove. The spaces between the successive driving pads or contact surfaces of each embodiment, are separated by spaces which obviously permit free escape of air, or water in case the drive is being operated while submerged.

It will be apparent that the local pad driving may be applied to belts operated singly as well as to multiple belt drives. These pads may also be applied to one side only of the belts without departing from the invention. The invention is also capable of application to drives having only one of the driving members provided with grooves. While the belts are preferably formed of relatively elastic material such as rubber composition comprising tenacious cords and fabric embedded in rubber, the groove walls may obviously be formed of elastic material and caused to cooperate with relatively inelastic belts.

It should be understood that it is not desired to limit the invention to the exact details of construction shown and described for obvious modifications may occur to persons skilled in the art.

It is claimed and desired to secure by Letters Patent:

1. In combination, a sheave element having a peripheral V-groove, and an elastic rubber composition V-belt element coactible with the opposite sides of said groove, the opposite surfaces of coaction of one of said elements with the other gradually approaching and receding from each other to initially provide oppositely disposed series of radiating lines of coaction between said elements convertible into segmental surfaces of coaction having rapidly increasing area as said elastic belt element is pulled deeper into said groove.

2. In combination, a sheave having a peripheral V-groove, and an elastic rubber composition V-belt cooperable with opposite sides of said groove, the opposite surfaces of said belt gradually approaching and receding from each other to initially provide oppositely disposed series of radiating lines of coaction between said elements convertible into segmental surfaces of coaction having rapidly increasing area as said elastic belt is pulled deeper into said groove.

In testimony whereof, the signature of the inventor is affixed hereto.

RAY C. NEWHOUSE.